(12) United States Patent
Frischmann et al.

(10) Patent No.: US 9,321,248 B2
(45) Date of Patent: Apr. 26, 2016

(54) TEAR-RESISTANT PACKAGING COMPOSITE FILM AND PACKAGING

(75) Inventors: Stefan Frischmann, Vohenstrauss (DE); Markus Kick, Vohenstrauss (DE); Dirk Kaczmarek, Weiden (DE)

(73) Assignee: CONSTANTIA HUECK FOLIEN GMBH & CO.KG, Pirk (DE)

( * ) Notice: Subject to any disclaimer, the term of this patent is extended or adjusted under 35 U.S.C. 154(b) by 666 days.

(21) Appl. No.: 13/498,708

(22) PCT Filed: Sep. 20, 2010

(86) PCT No.: PCT/EP2010/063784
§ 371 (c)(1),
(2), (4) Date: Jun. 8, 2012

(87) PCT Pub. No.: WO2011/039067
PCT Pub. Date: Apr. 7, 2011

(65) Prior Publication Data
US 2012/0241449 A1    Sep. 27, 2012

(30) Foreign Application Priority Data
Sep. 29, 2009    (DE) .......................... 10 2009 043 310

(51) Int. Cl.
| | | |
|---|---|---|
| B32B 3/24 | (2006.01) | |
| B65D 51/00 | (2006.01) | |
| B32B 27/08 | (2006.01) | |
| B32B 7/12 | (2006.01) | |
| B32B 25/08 | (2006.01) | |
| B32B 27/34 | (2006.01) | |
| B32B 3/26 | (2006.01) | |
| B32B 27/30 | (2006.01) | |

(52) U.S. Cl.
CPC . *B32B 27/08* (2013.01); *B32B 7/12* (2013.01); *B32B 25/08* (2013.01); *B32B 27/34* (2013.01); *B32B 3/266* (2013.01); *B32B 27/306* (2013.01); *B65D 2215/04* (2013.01); *Y10T 428/24331* (2015.01)

(58) Field of Classification Search
CPC .......... B32B 7/12; B32B 27/34; B32B 27/08; B32B 3/266; B32B 27/306; B32B 25/08; B65D 2215/04; Y10T 428/24273; Y10T 428/24322; Y10T 428/24331; Y10T 428/24355; Y10T 428/24298; Y10T 428/24314; Y10T 428/12361; Y10T 428/15; Y10T 156/1064
USPC ................ 428/34.1, 35.7, 138, 131, 98, 35.6, 428/35.8, 35.9; 220/200
See application file for complete search history.

(56) References Cited

U.S. PATENT DOCUMENTS

| | | | |
|---|---|---|---|
| 5,173,357 A | * | 12/1992 | Nakane et al. ................ 428/220 |
| 5,786,092 A | | 7/1998 | Lorenzo et al. |
| 2007/0068842 A1 | | 3/2007 | Pasbrig |
| 2009/0008820 A1 | | 1/2009 | Duffield et al. |

FOREIGN PATENT DOCUMENTS

| | | |
|---|---|---|
| EP | 0 769 369 A2 | 4/1997 |
| EP | 1 468 817 A1 | 10/2004 |
| EP | 1 655 237 A1 | 5/2006 |
| JP | 2005 119 710 A | 5/2005 |
| JP | 2005119710 * | 5/2005 |
| WO | 95/08440 A1 | 3/1995 |

* cited by examiner

*Primary Examiner* — Yan Lan
(74) *Attorney, Agent, or Firm* — McGlew and Tuttle, P.C.

(57) ABSTRACT

The packaging composite film has an outside and an inside. It also includes a cover layer facing the outside, an inner layer, which faces the inside and has a lower puncture and tear resistance than the cover layer, and a liquid-soluble intermediate layer arranged between the cover layer and the inner layer. To transport liquid from the outside to the liquid-soluble intermediate layer, liquid-transporting openings are provided, which completely penetrate the cover layer and extend in the direction of the inside at least to the intermediate layer, without including the inner layer. A childproof packaging, which is nevertheless easy to open and therefore senior-friendly, can be realized by means of the packaging composite film.

29 Claims, 2 Drawing Sheets under 35 U.S.C. §119 of German
TEAR-RESISTANT PACKAGING COMPOSITE FILM AND PACKAGING

CROSS REFERENCE TO RELATED APPLICATIONS

This application is a United States National Phase application of International Application PCT/EP2010/063784 and claims the benefit of priority under 35 U.S.C. §119 of German Patent Application Serial No. 10 2009 043 310.4 filed Sep. 29, 2009, the entire contents of which are incorporated herein by reference.

FIELD OF THE INVENTION

The invention relates to a packaging composite film with an outside and an inside and a packaging realized with a packaging composite film of this type.

BACKGROUND OF THE INVENTION

Packaging composite films of this type may, for example, be used to close containers or packagings for pharmaceutical products, such as, for example, blister packaging. There are very high safety requirements for the packaging of particularly strong medications. This also applies to the packaging composite films used in this case. In particular, a high degree of child safety is required. Above all, children should not be able to open packagings of this type by biting.

On the other hand, it is required that it should nevertheless be possible for older people or people with restricted coordination ability to remove the medications from the packagings relatively unproblematically. The packagings including their packaging composite films should therefore also be senior-friendly.

A packaging composite film is described in JP 2005 119 710 A, in which an opening portion is provided in an edge region. Part regions with perforations coming from the inside of the packaging composite film as well as a further part region with a water-soluble intermediate layer are located within this opening portion. This known packaging composite film is intended for food packagings, but not for childproof and senior-friendly packaging of pharmaceutical products.

A packaging composite film in the form of a layer composite made of a water-soluble substrate, a peelable intermediate layer and a water-insoluble cover layer is furthermore described in U.S. Pat. No. 5,786,092 A. This packaging composite film is not suitable either for the childproof and senior-friendly packaging of pharmaceutical products.

A packaging composite film for a blister packaging for childproof and senior-friendly packaging of medications and medical products is described in EP 1 468 817 A1 and EP 1 655 237 A1. This packaging composite film consists of an aluminum film as the inner layer, which is provided on the outside, for example, with a cover layer made of paper or of a polyester (PET) film and, on the inside, with a plastics material film, for example made of polyvinyl chloride (PVC), polyvinylidene chloride (PVDC), polypropylene (PP), polyester (PET) or polychlorotrifluoroethylene (PCTFE). The inside plastics material film may optionally be monoaxially or biaxially oriented.

A (blister) packaging closed with a packaging composite film of this type satisfies the required child safety, but can only be opened with difficulty, in particular only with a tool enclosed with the packaging, for example a small scalpel. Cutting tools of this type cannot be carried everywhere, for example in airplanes, so there may be problems in opening the packaging.

SUMMARY OF THE INVENTION

An object of the invention therefore consists in disclosing a packaging composite film of the type mentioned at the outset, which is both childproof and senior-friendly, and can be opened particularly easily.

This object is achieved by a packaging composite film comprising at least a covering layer facing the outside, an inner layer facing the inside and having a smaller puncture and tear resistance than the covering layer, and a liquid-soluble intermediate layer arranged between the cover layer and the inner layer. To transport liquid from the outside to the liquid-soluble intermediate layer, liquid-transporting openings are also provided, which completely penetrate at least the cover layer and extend in the direction of the inside at least to the intermediate layer, without including the inner layer.

The packaging composite film according to the invention, because of the cover layer, has very high mechanical stability and strength, so a childproof packaging can be realized, in particular for a pharmaceutical product, by means of this packaging composite film. The packaging composite film has these excellent mechanical properties in the dry state. The composite is firmly joined in this state.

This firm joining can be released by bringing the intermediate layer into contact with a liquid. This takes place by means of the liquid-transporting openings which, for example in the form of blind holes, pass through the cover layer and extend at least up to the liquid-soluble intermediate layer. The cover layer consisting, in particular, of a liquid-impermeable material, is then nevertheless liquid-permeable because of the liquid-transporting openings. If the liquid comes into contact with the intermediate layer through the liquid-transporting openings, this dissolves, at least partially. In particular, the adhesive force within the packaging composite film reduces, so the cover layer can be peeled off without much effort. As a result, the packaging composite film loses its high puncture and tear resistance. The remaining inner layer, compared with the cover layer, only has a significantly lower mechanical strength. In particular, the inner layer can easily be pierced or torn after the removal of the cover layer in order to thus arrive at the content of a packaging closed by the packaging composite film.

Once the packaging composite film has been brought into contact with liquid, for example by simple immersion in a liquid, a packaging closed by means of the packaging composite film can thus be very easily opened and, in particular, without using a cutting tool. Apart from child safety, also senior-friendliness is also provided.

The liquid-transporting openings are not, in particular continuous perforations through the packaging composite film. The inner layer is completely untouched by these liquid-transporting openings, so a liquid-tight packaging of a product is possible by means of the packaging composite film because of the preferably liquid-impermeable inner layer, despite the liquid-permeable cover layer.

According to a preferred configuration, the liquid-soluble intermediate layer is formed based on cellulose, an amino resin, a hydrophilic acrylate, an, in particular, acetalized polyvinyl alcohol (PVOH), a polyvinyl acetal or a gluten. These substances have the liquid-soluble property desired in the framework of the packaging composite film according to the invention. These materials are also freely available and can be easily integrated in a composite film as the intermediate layer.

According to a further preferred configuration, the liquid-soluble intermediate layer is configured as a film layer, which is produced separately from the packaging composite film and embedded after its production in the packaging composite film, thus, in particular, as a separate film, with a thickness of preferably between 5 μm and 200 μm. In this configuration, the intermediate layer configured in a film-like manner may thus be a purchased product, which is inserted in the framework of the production of the packaging composite film as a separate layer. As a result, it is possible to produce the packaging composite film easily and rapidly. Comparatively large layer thicknesses of the intermediate layer can also be produced with this configuration. The time period for the dissolving of the intermediate layer inter alia also depends on its layer thickness, so the layer thickness is also a design parameter for the duration of the dissolving.

According to a further preferred configuration, the liquid-soluble intermediate layer is configured as a coating layer, in particular as a lacquer, glue, film or co-extrusion coating with a thickness of preferably between 1 μm and 10 μm, preferably between 3 μm and 4 μm. The intermediate layer is thus firstly produced in this configuration in the framework of the production of the packaging composite film, for example, by means of laminating, lacquering, in particular lacquering by means of a wide slot nozzle (so-called "curtain coating"), gravure, flexo or screen printing. As a result, very thin layer thicknesses may be realized, so that only a little liquid is necessary to bring about a dissolving of the bond and to allow the peeling off of the cover layer. Moreover, the total thickness of the packaging composite film can also be reduced with this configuration.

According to a further favorable configuration, the liquid, which dissolves the intermediate layer, is water. Thus, the intermediate layer is then water-soluble. This is particularly favorable as water is generally available. The moistening of the intermediate layer is then very easy and possible at practically any time. This may, for example, also take place by means of immersion in a drink—actually intended for consumption. Basically, another liquid may also be used, however, instead of water in order to release the holding force in the bond of the packaging composite film.

According to a further preferred configuration, the inner layer is formed from aluminum with a thickness of preferably between 5 μm and 80 μm. Aluminum foils of this type are a widespread basic material for packaging composite films. They are also freely available and are distinguished by the required properties, such as a lower puncture and tear resistance compared to the cover layer and a liquid impermeability. Basically, hard and soft aluminum foils may be used, an aluminum foil being called "hard" if it has not been annealed after rolling. The resulting aluminum foil crackles and tears more easily than an aluminum foil which has also been subjected to an annealing process after rolling and which is accordingly called "soft". An aluminum foil, which has again been annealed after rolling, in other words is soft, is preferred, as the puncture and tear resistance of the bond of the packaging composite film can thereby be increased.

According to a further preferred configuration, the cover layer is formed from a plastics material, in particular from a polyester (PET, polyethylene terephthalate), a preferably oriented polyamide (oPA) or a polyvinyl chloride (PVC), and has a thickness of preferably between 5 μm and 100 μm. These materials are particularly suitable for the cover layer. They have a comparatively high puncture and tear resistance and therefore ensure that a packaging produced by means of the packaging composite film cannot be opened without an auxiliary means in the dry state.

According to a further favorable configuration, a whole-area adhesive layer, which is constructed, in particular, of two whole-area part layers arranged one above the other, preferably of a laminating adhesive part layer and a primer part layer, is arranged between the liquid-soluble intermediate layer and the inner layer. A particularly good adhesion is thus achieved between the inner layer and the intermediate layer.

According to a further preferred configuration, all the liquid-transporting openings taken together have an area proportion of between 2% and 10% of a total area of the packing composite film. Owing to the area proportion of the liquid-transporting openings, the speed at which the adhesive effect in the composite of the packaging composite film is dissolved upon a contact of liquid can be adjusted. With too small an area proportion, this process lasts too long or does not lead to the desired result at all. With too large an area proportion, on the other hand, the risk exists of the liquid unintentionally reaching the intermediate layer and therefore resulting in a too early or too rapid peeling off of the cover layer, so the required child safety is no longer provided. In particular, the contact with saliva, if a child bites on a packaging closed with the packaging composite film, should not easily lead to the cover layer being able to be peeled off. It has been found that an area proportion of the liquid-transporting openings in the area mentioned of between 2% and 10% deals very well with the two conflicting tendencies. With an area proportion of this type, on the one hand, the cover layer can be rapidly released after targeted contact with liquid, with, on the other hand, an undesired release of the cover layer still being adequately being well prevented in the event of a chance contact with liquid.

According to further advantageous configuration, the liquid-transporting openings have a round, in particular point-shaped or dashed-shaped cross-section and are arranged distributed, in particular uniformly, over a total area of the packaging composite film. This geometric configuration and distribution of the liquid-transporting openings means that the adhesive effect in the bond of the packaging composite film is dissolved practically everywhere and substantially uniformly after a targeted contact with liquid. Basically, however, other geometric cross-sectional shapes are also conceivable, however, for the liquid-transporting openings. Thus, these may also take on a particular graphic form, for example that of a company logo or a product name. Apart from the functional property of transporting the liquid to the intermediate layer, the liquid-transporting openings then also fulfill a characterizing or informative function.

According to further favorable configuration, the inner layer is provided on the inside with a whole-area sealing layer, in particular a heat sealing lacquer layer. This means that the packaging composite film can be used directly for sealing a packaging container. The whole-area application of the heat sealing lacquer layer on the inside allows the largest possible flexibility with regard to the shape and size of the edge of a container to be closed.

According to further favorable configuration, the cover layer is provided on the outside with a liquid-permeable and, in particular, a bitter substance-containing outer layer. The liquid permeability means that a liquid can also penetrate this outer layer and thus arrive at the significant intermediate layer. The bitter substance preferably provided as a component in the outer layer prevents children from putting a packaging closed with the packaging composite film in the mouth or at least keeping it in the mouth for a relatively long time period, so that contact with the saliva for too long would be possible and a reduction in the adhesive effect in the bond of the packaging composite film therefore occurring, which is undesired in this case. The bitter substance can optionally also be contained as a component in the cover layer.

The liquid-permeable outer layer is preferably formed from a liquid-permeable material, such as, for example, from paper. An outer paper coating of this type is conventional. In a simple manner, it allows information, graphic configurations and/or indications of origin to be printed on the packaging composite film. With an outer paper coating, the packaging composite film has a visual appearance and feel, which—despite the internally significantly different structure—are similar to in packaging composite films which are already known for childproof and senior-friendly packagings.

According to a further favorable configuration, the liquid-transporting openings also completely penetrate the liquid-permeable outer layer. As a result, the transport of the liquid to the significant intermediate layer is facilitated or ensured at all in the first place. The latter is, in particular, the case when the liquid-permeable outer layer according to a further configuration is formed from a plastics material, such as, for example, from a polyester. The outer layer can thus also be formed from a liquid-impermeable material. The liquid permeability, similar to in the cover layer, is then ensured by the continuous liquid-transporting openings.

A further object of the invention consists in disclosing a packaging of the type designated at the outset, which is childproof and senior-friendly and, in particular, can be easily opened.

This further object is achieved by a packaging comprising a molded part, which contains at least one receptacle for receiving at least one product to be packaged, and a packaging composite film according to the invention according to one of the above-described configurations for closing the at least one receptacle, the inside of the packaging composite film facing the packaged product.

The packaging according to the invention may, in particular, be configured as a blister packaging. The product to be packaged may, for example, be a medication or another medical product to be stored safely. The packaging according to the invention has the same advantages, which have already been described above in conjunction with the packaging composite film according to the invention. Likewise, the same advantageous configurations as for the packaging composite film according to the invention can be disclosed for the packaging according to the invention.

The present invention will be explained in more detail below on the basis of drawings, which show exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
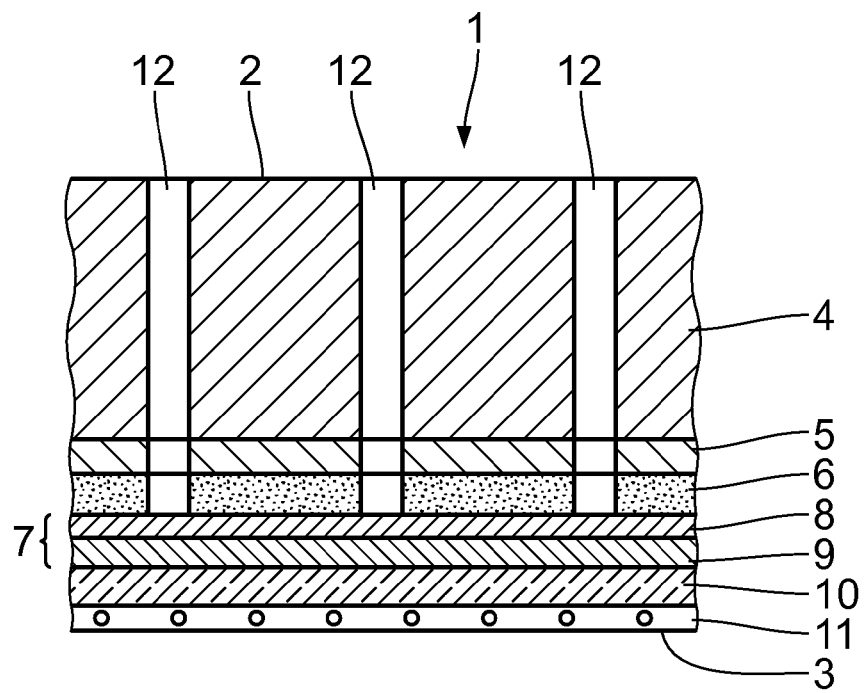
FIG. 1 is a sectional view of a section through a first embodiment of a packaging composite film with a liquid-soluble intermediate layer.

Mutually corresponding parts are provided with the same reference numerals in FIG. 1 to 5. Details of the embodiments described in more detail below may also, taken per se, represent an invention or be part of an inventive subject.

Figure 2:
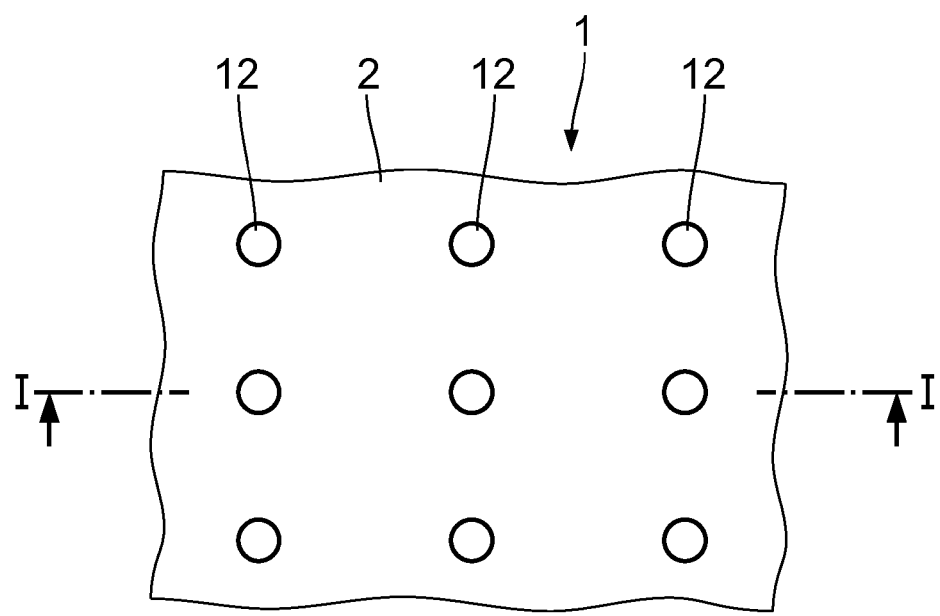
FIG. 2 is a plan view of the outside of the packaging composite film according to FIG. 1.
Figure 3:
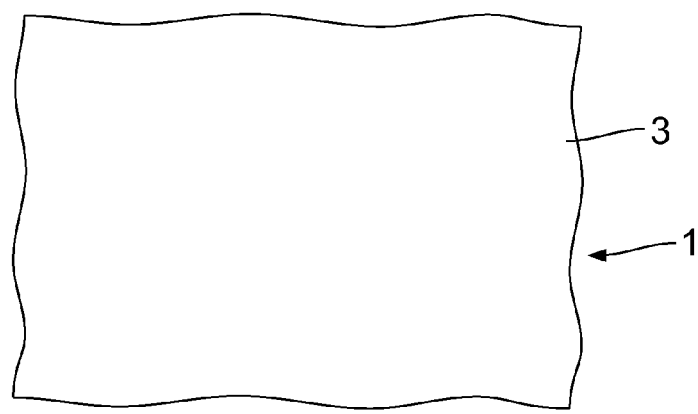
FIG. 3 is a plan view from the inside onto the packaging composite film according to FIG. 1.

FIG. 1 to 3 show a first embodiment of a packaging composite film 1 with an outside 2 and inside 3. The section shown in FIG. 1 is indicated in FIG. 2 by the sectional line I-I. The packaging composite film 1 is, in particular, a layer composite of a plurality of layers. Proceeding from the outside 2, it comprises a layer structure with an outer layer 4, a mechanically stable, in particular very puncture and tear resistant, cover layer 5, a liquid-soluble intermediate layer 6, a two-layer adhesive layer 7 with a laminating adhesive part layer 8 and a primer part layer 9, an inner layer 10 and a whole-area heat-sealing lacquer layer 11 arranged on the inside. Apart from liquid-transporting openings 12, all the layers 4 to 11 in particular have a whole-area configuration.

The liquid-transporting openings 12, proceeding from the outside 2, extend to the liquid-soluble intermediate layer 6. In particular, they penetrate the outer layer 4 and the cover layer 5 completely. In the embodiment shown, the liquid-transporting openings 12 also completely penetrate the intermediate layer 6. In total, the liquid-transporting openings 12 are configured as blind holes. They end with the intermediate layer 6. In particular, they do not include the inner layer 10. The liquid-transporting openings 12 have a round cross section, which can be seen from the plan view from the outside according to FIG. 2. According to the plan view shown in FIG. 3 from below or the inside, the liquid-transporting openings 12 do not reach to the inside 3. Basically, the liquid-transporting openings 12 can also completely penetrate the adhesive layer 7 and only end directly on the inner layer 10. The inner layer 10 is thus also not included by the liquid-transporting openings 12 in this alternative embodiment, not shown.

The liquid-transporting openings 12, in relation to the surface, are arranged uniformly distributed on the outside 2. The area proportion of all the liquid-transporting openings 12 taken together in the embodiment shown is 6% of the total area of the packaging composite film 1 on the outside 2.

The liquid-transporting openings 12 extend in the thickness direction of the packaging composite film 1 in the embodiment shown up to the boundary between the intermediate layer 6 and the adhesive layer 7. However, other configurations with hole depths of the liquid-transporting openings 12 differing from this are also possible. Thus, the liquid-transporting openings 12 may already end in the region of the intermediate layer 6 or only end in the region of the adhesive layer 7. Basically, the bases of the liquid-transporting openings 12 configured as blind holes may be arranged at any desired point between the surface of the intermediate layer 6 facing the cover layer 5 and the surface of the separating layer 10 facing the adhesive layer 7.

The outer layer 4, in the embodiment shown, is formed from a polyester material, which is intrinsically liquid-impermeable. However, because of the liquid-transporting openings 12, the outer layer 4 also becomes permeable to a liquid such as, for example, water. The outer layer has a layer thickness of 50 μm.

The outer layer 5, in the embodiment shown, also consists of a polyester material, which is intrinsically liquid-impermeable. Because of the liquid-transporting openings 12, liquid can, however, also penetrate through the cover layer 5 and arrive at the intermediate layer 6 arranged below the cover layer 5. The cover layer 5 has a layer thickness of 12 μm.

A thin layer of laminating lacquer may be provided between the outer layer 4 and the cover layer 5 if necessary to ensure adhesion between these two layers 4 and 5.

The intermediate layer 6 is liquid-soluble, in particular water-soluble. It consists of an acetalized polyvinyl alcohol (PVOH). In the embodiment according to FIG. 1 to 3, the intermediate layer 6 is configured as a separate film with a layer thickness of 35 μm. The intermediate layer 6 is thus a separately produced water-soluble PVOH film.

The adhesive layer 7 is used for the connection between the intermediate layer 6 and the inner layer 10 configured as an aluminum foil with a foil thickness of 20 μm. The whole-area heat-sealing lacquer layer 11 is provided on the lower side of the inner layer 10 facing the inside 3. The whole-area application facilitates production compared with configurations in the prior art, in which recesses are present in the heat-sealing lacquer layers provided there.

The bond of the various layers of the packaging composite film 1 is firm in the dry state. The mechanical properties of the packaging composite film 1 are above all determined in this state by the cover layer 5, which is distinguished by a particularly high mechanical puncture and tear resistance. In particular, these resistances in the cover layer 5 are significantly more pronounced than in the inner layer 10. The high mechanical stability applies to the whole packaging composite film 1, as long as this adheres together firmly per se.

However, this is only ensured in the dry or substantially dry state. If the packaging composite film 1 comes into contact with liquid, in particular with water, the adhesion in the bond of the packaging composite film 1 and therefore also the mechanical properties, change. The liquid arrives via the liquid-transporting openings 12 at the liquid-soluble intermediate layer 6, which is changed by the penetrating liquid with respect to its mechanical properties. The structure of the intermediate layer 6 at least partially dissolves under the influence of the penetrating liquid. Both the inner cohesion within the intermediate layer 6 and the adhesive power thereby reduce in relation to the adjoining layers, in other words the cover layer 5 and the adhesive layer 7. Because of this dissolving or partial dissolving of the intermediate layer 6 caused by liquid, the cover layer 5 decisive for the mechanical stability of the packaging composite film 1, together with the outer layer 4 arranged on the outside, can be peeled off without particular effort. The remaining part of the packaging composite film 1 then has a significantly reduced mechanical stability. In particular, the aluminum foil of the inner layer 10 can easily be pierced or else torn through.

The packaging composite film 1 in the dry state thus has a very high mechanical stability, whereas, after contact with liquid, this mechanical stability is significantly reduced. To this extent, this packaging composite film 1 is very suitable for realizing a childproof and senior-friendly packaging, in which, for example, medications or other products particularly worth protecting are packaged.

Figure 4:
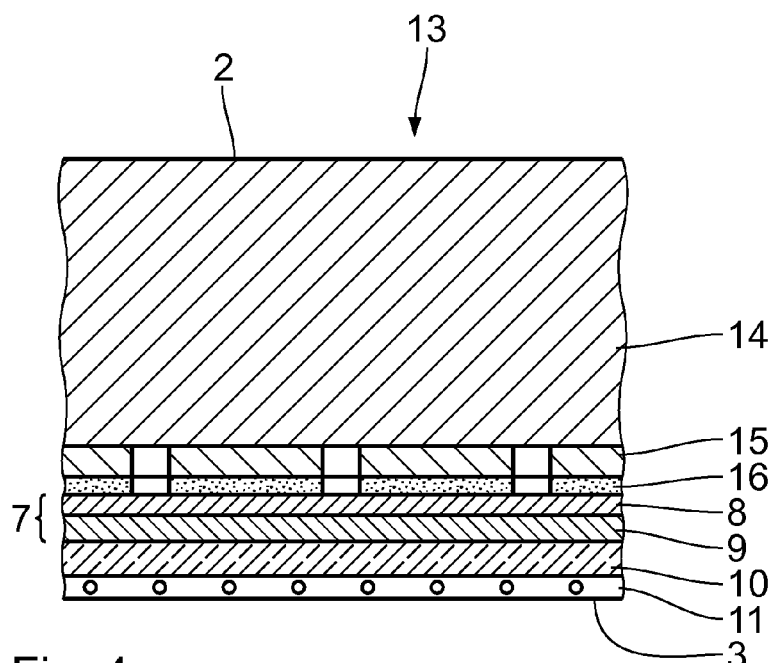
FIG. 4 is a sectional view of a section through a second embodiment of a packaging composite film with a liquid-soluble intermediate layer and an unperforated outer layer.

A section through a second embodiment of a packaging composite film 13 is shown in FIG. 4 and is also suitable for realizing a childproof packaging, which is nevertheless easy to open and therefore senior-friendly. The structure thereof is similar to that in the packaging composite film 1 according to FIG. 1 to 3.

A difference is in the outer layer 14, which, in the packaging composite film 13 is configured as a layer of kraft paper with a specific weight of 40 $g/m^2$. The outer layer 14 contains a bitter substance, to prevent children from putting the packaging composite film 13 and a packaging realized therewith in the mouth—at least for a relatively long time period.

In the layer sequence of the packaging composite film 13, adjoining the outer layer 14 is a cover layer 15, which also consists of polyester (PET), has a layer thickness of 12 μm and, precisely as in the packaging composite film 1, decisively determines the mechanical stability in the dry state. Following the cover layer 15 is an intermediate layer 16, which is in turn liquid-soluble and is, however, not configured as a separate film in this embodiment, but as a coating layer of PVOH. This intermediate layer 16 is, for example, applied by means of a laminating, lacquering, gravure printing, flexo printing or screen printing technique. It has a smaller layer thickness, which is only about 3.5 μm in this embodiment. The liquid-transporting openings 17 arranged uniformly over the total area of the packaging composite film 13 extend only within the cover layer 15 and the intermediate layer 16 in this embodiment. Because of the paper material provided, the outer layer 14 is already liquid-permeable in any case. A transfer of liquid from the outside 2 to the cover layer 15 and above all to the intermediate layer 16 is also possible without separate liquid-transporting channels within the outer layer 14.

The part layer sequence, which adjoins below the intermediate layer 16, corresponds to that in the packaging composite film 1 according to FIG. 1 to 3.

The mode of functioning of the packaging composite film 13 is substantially precisely as in the packaging composite film 1. A firm and mechanically stable bond is also ensured here between the individual layers in the dry state, whereas the cohesion is weakened in the region of the liquid-soluble intermediate layer 16 as soon as it comes into contact with a liquid. The adhesive force acting on the cover layer 15 reduces strongly, so that after a corresponding moistening through of the intermediate layer 16, the cover layer 15 together with the outer layer 14 can in turn be peeled off without difficulties.

Figure 5:
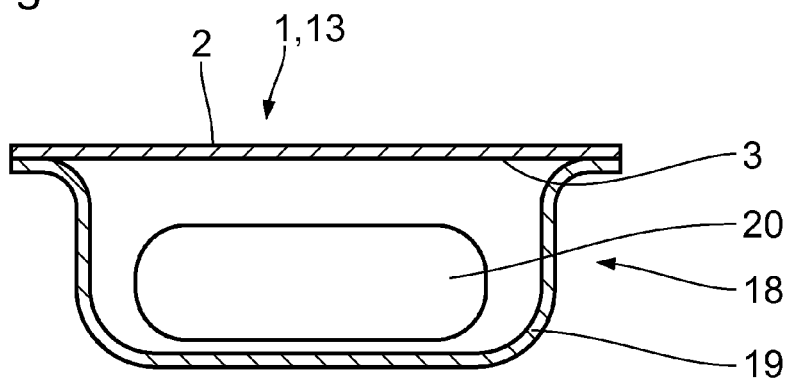
FIG. 5 is a sectional view of an embodiment of a childproof and senior-friendly packaging in a cross-sectional view, realized by means of the packaging composite film according to FIG. 1 to 3 or according to FIG. 4.

A childproof and senior-friendly packaging 18 shown in a cross sectional view in FIG. 5 can be realized by means of the packaging composite films 1 and 13. The packaging composite film 1 or 13 is firmly applied to a plastics material container 19 by means of the heat-sealing lacquer layer 11. The plastics material container 19 is a molded part with a receptacle for a pharmaceutical product, for example a tablet 20. The inside 3 of the packaging composite film 1 or 13 faces the tablet 20 here. The packaging 18 is a blister packaging.

Because of the particularly stable mechanical properties of the packaging composite film 1 or 13 in the dry state, the packaging 18 fulfils the requirements of the relevant class F1. This means that 80% of children used as test people, who were given a packaging 18 of this type are not in a position to remove the tablet 20 from the packaging 18 within ten minutes (five minutes before and five minutes after demonstration of the opening mechanism). On the other hand, an adult, for example because of the instruction directly provided on the packaging 18 or on an outer packaging to moisten the packaging composite film 1 or 13, is easily in a position to open the packaging 18. No particular skill is necessary for this, so this is also possible without problems for people with restricted coordination ability, for example older people.

While specific embodiments of the invention have been shown and described in detail to illustrate the application of the principles of the invention, it will be understood that the invention may be embodied otherwise without departing from such principles.

The invention claimed is:

1. A packaging composite film with an outside and an inside, the packaging composite film comprising:
   a cover layer facing the outside;
   an inner layer facing the inside, said inner layer having a lower puncture and tear resistance than a puncture and tear resistance of said cover layer, said inner layer having a first end and a second end, said inner layer extending continuously, without interruption from said first end to said second end; and
   a liquid-soluble intermediate layer arranged between the cover layer and the inner layer, wherein liquid-transporting openings completely penetrate at least the cover layer and extend in a direction of the inside at least to the intermediate layer for transporting liquid from the outside to the liquid-soluble intermediate layer, said inner layer being free of openings, said inner layer being completely untouched by said liquid-transporting openings, whereby said liquid-transporting openings do not penetrate said inner layer, at least said cover layer, said inner layer and said liquid-soluble intermediate layer defining a packaging composite film structure, said inner layer, said cover layer and said liquid-soluble intermediate layer extending from one side of said packaging composite film structure to another side of said packaging composite film structure.

2. A packaging composite film according to claim 1, wherein said cover layer, said inner layer and said liquid-soluble intermediate layer define said packaging composite film structure in a dry state, wherein an adhesive force within said packaging composite film structure is reduced once said packaging composite film structure is in contact with liquid such that said cover layer is completely removable.

3. A packaging composite film according to claim 2, wherein the liquid-soluble intermediate layer is configured as a film layer, which is produced separately from the packaging composite film and embedded after production in the packaging composite film, wherein the liquid-soluble intermediate layer is formed based on one of cellulose, an amino resin, a hydrophilic acrylate, a polyvinyl alcohol, a polyvinyl acetal and a gluten.

4. A packaging composite film according to claim 2, wherein the liquid-soluble intermediate layer is configured as a coating layer.

5. A packaging composite film according to claim 2, wherein the liquid-soluble intermediate layer is water-soluble.

6. A packaging composite film according to claim 2, wherein the inner layer is formed from aluminum.

7. A packaging composite film according to claim 6, wherein the inner layer is formed from aluminum with a thickness of between 5 μm and 80 μm.

8. A packaging composite film according to claim 2, wherein the cover layer is formed from a plastics material.

9. A packaging composite film according to claim 8, wherein the cover layer is formed from a plastics material with a thickness of between 5 μm and 100 μm.

10. A packaging composite film according to claim 2, wherein arranged between the liquid-soluble intermediate layer and the inner layer is a whole-area adhesive layer.

11. A packaging composite film according to claim 10, wherein the whole-area adhesive layer is constructed from two whole-area part layers arranged one above the other.

12. A packaging composite film according to claim 2, wherein all the liquid-transporting openings taken together have an area proportion of between 2% and 10% of a total area of the packaging composite film.

13. A packaging composite film according to claim 2, wherein the liquid-transporting openings have a round or dash-like cross section.

14. A packaging composite film according to claim 2, wherein the inner layer is provided on the inside with a whole-area sealing layer.

15. A packaging composite film according to claim 2, wherein the cover layer is provided on the outside with a liquid-permeable outer layer, said cover layer being in direct contact with said liquid-permeable outer layer.

16. A packaging composite film according to claim 15, wherein the liquid-permeable outer layer is formed from a liquid-permeable material.

17. A packaging composite film according to claim 15, wherein the liquid-transporting openings also completely penetrate the liquid-permeable outer layer.

18. A packaging composite film according to claim 17, wherein the liquid-permeable outer layer is formed from a plastics material.

19. A packaging composite film according to claim 17, wherein the liquid-permeable outer layer is formed from a polyester.

20. A packaging composite film according to claim 15, wherein the liquid-permeable outer layer is formed from paper.

21. A packaging composite film according to claim 2, wherein the liquid-soluble intermediate layer is formed based on an acetalized polyvinyl alcohol.

22. A packaging composite film according to claim 2, wherein the liquid-soluble intermediate layer is configured as a film layer with a thickness between 5 μm and 200 μm.

23. A packaging composite film according to claim 2, wherein the liquid-soluble intermediate layer is configured as one of a lacquer coating, glue coating, film coating and coextrusion coating.

24. A packaging composite film according to claim 2, wherein the liquid-soluble intermediate layer is configured as a coating layer with a thickness of between 1 μm and 10 μm.

25. A packaging composite film according to claim 2, wherein the liquid-soluble intermediate layer is configured as a coating layer with a thickness of between 3 μm and 4 μm.

26. A packaging composite film according to claim 2, wherein the cover layer is formed from one of a polyester, an oriented polyamide and a polyvinyl chloride, wherein arranged between the liquid-soluble intermediate layer and the inner layer is a whole-area adhesive layer, which is constructed from a laminating adhesive part layer and from a primer part layer.

27. A packaging composite film according to claim 2, wherein the liquid-transporting openings are arranged uniformly distributed over a total area of the packaging composite film.

28. A packaging composite film according to claim 2, wherein the inner layer is provided on the inside with a heat-sealing lacquer layer, said heat-sealing lacquer layer being in direct contact with said inner layer, wherein at least one adhesive layer is provided on one side of said inner layer, said inner layer being in direct contact with said at least one adhesive layer, said heat-sealing lacquer layer being located on another side of said inner layer.

29. A packaging composite film according to claim 2, wherein the cover layer is provided on the outside with a bitter substance-containing outer layer, said cover layer being located between said outer layer and said liquid-soluble intermediate layer.

\* \* \* \* \*